UNITED STATES PATENT OFFICE.

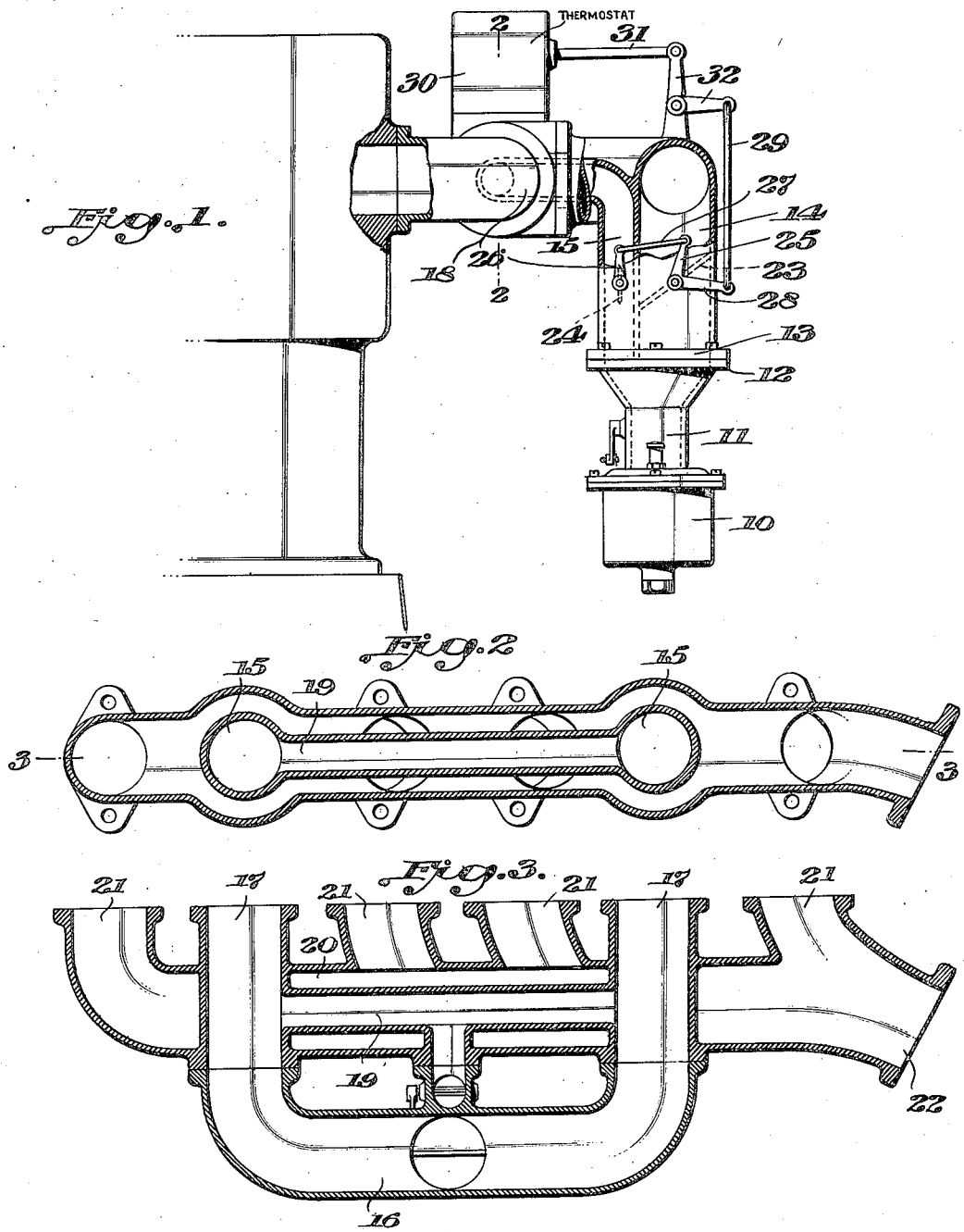

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

1,415,086. Specification of Letters Patent. Patented May 9, 1922.

Application filed June 6, 1919. Serial No. 302,127.

*To all whom it may concern:*

Be it known that I, HAROLD D. CHURCH, a citizen of the United States, and resident of Detroit, Wayne County, State of Michigan, have invented certain new and useful Improvements in Hydrocarbon Motors, of which the following is a specification.

This invention relates to hydrocarbon motors, and particularly to means for facilitating the starting of the motor when cold.

The principal object of the invention is to provide a construction of the inlet and exhaust manifolds in conjunction with valve means between the carburetor and manifolds, whereby the mixture passing through the intake manifold may be directed to or diverted from a heated surface by which the mixture is to be vaporized, so that during the initial running of the engine after it has been started when cold, the mixture may be directed to the hot spot and then after the motor has become sufficiently warm the mixture may be carried directly into the intake manifold without being previously heated so as to avoid undue expansion of the gases.

With this object and others in view, the invention is embodied in preferable form in the construction and arrangement hereinafter described and illustrated in the accompanying drawings, in which:

Figure 1 is an end view in elevation, partly in section, showing the device applied to a hydrocarbon motor, Figure 2 is a vertical section on the line 2—2 of Figure 1, and Figure 3 is a horizontal section on the line 3—3 of Figure 2.

Referring to the drawings, 10 indicates a carburetor of conventional type, 11 a conduit leading therefrom and adapted to convey the explosive mixture formed in the carburetor, and 12 is a coupling communicating with a two-part vertical pipe section 13 which communicates with the conduit 11 and extends vertically above the latter and is adapted to lead into the intake manifold. The section 13 is divided into a vertical passageway 14 and passageways 15 parallel thereto. At its upper end the passageway 14 communicates with the main horizontal section 16 of an intake manifold, which in turn is adapted to communicate by branches 17 with the passageways leading to the cylinder of an internal combustion engine. The upper end of the passageway 15 communicates with connecting branches 18 which lead to an auxiliary intake manifold section 19, which in turn communicates at each end thereof with the intake branches 17.

The auxiliary intake manifold section 19 is mounted within the exhaust manifold 20, which communicates by ports 21 with the cylinders and which has an outlet 22 leading to the muffler or to the atmosphere.

Mounted within the passageway 14 is a valve 23 which may be of the butterfly type and which is adapted to control the passage of the intake mixture through said passageway. Similarly mounted in the smaller passageways 15 is a valve 24 controlling the passage of mixture through this part of the divided intake conduit. The valves are interconnected for operation and to this end, valve 23 is provided with a lever 25, and valve 24 with a lever 26, which are adapted to be connected by a link 27, while a lever arm 28 is also connected to the pivot rod of the first valve and is operated by a connecting rod 29. The levers of the respective valves are so arranged relatively that when one valve is opened the other will be closed, and vice versa. The valves are adapted to be operated from any suitable source of power. Although the connecting rod may be operated by hand, yet in the particular embodiment of the invention here illustrated I have shown means for operating the valves automatically and consisting preferably of a thermostat 30, connecting by rod 31 and bell crank 32, with the connecting rod 29. In the arrangement just described it will be seen that the operation of the valves is dependent upon and responsive to the changes in temperature of the motor.

In the operation of the device, when the motor is comparatively cold, the valves 23 and 24 will be in a position to permit the free passage of the explosive mixture from the carburetor into and through the passageways 15 and to cut off the passageway 14 leading to the main branch of the intake manifold. The mixture passing from the passageways 15 into the auxiliary intake manifold section 19 will be heated to a point producing vaporization to a substantial degree owing to the heat imparted to the walls of the section 19 from the exhaust gases passing through the exhaust pipe 20 which surrounds said section 19. The gases thus heated and vaporized will pass from the section 19 into the branches 17 and thus into the cylinders of the engine. After the engine becomes thoroughly warmed the position of the valves 23 and 24 will be reversed either by hand or automatically by the expansion of the thermostat, so that valve 23 will be opened and valve 24 closed, whereupon the mixture will be diverted from the heating space provided by the auxiliary intake manifold section to the main intake manifold 16, so that there will be no contact of the mixture for any considerable distance with the heated walls of the exhaust manifold, whereby the gases enter the cylinders at substantially their usual temperature, thus preventing an undue expansion thereof.

It will be seen that the arrangement above described enables the mixture heating effect to be obtained by a construction in which conventional forms of intake and exhaust manifolds are employed. The arrangement described also enables the location of the valves which control the heating of the mixture, within that part of the passageways which carries only a relatively cool mixture, and at a point remote from the heat of the exhaust, whereby warping or other distortion of the valves is avoided.

Having thus described my invention, what I claim and desire to secure by Letters Patent is:

1. The combination with an internal combustion engine, of an exhaust manifold, spaced intake passages extending transversely through said manifold, an auxiliary intake passage arranged within the exhaust manifold and connecting said spaced passages, and means for directing the explosive mixture to either the spaced passages or to the auxiliary passage.

2. In combination with an internal combustion engine, including an exhaust manifold lying on one side of the cylinders of the engine, an intake manifold having a main section extending parallel to and outside of the exhaust manifold and having an auxiliary section lying within a part of the exhaust manifold and adapted to be heated thereby, common branches for said two sections of the intake manifold leading therefrom to the cylinders, said manifold having separate passageways leading to said intake sections, separate valves controlling said passageways, and means for simultaneously opening one valve and closing the other.

3. In combination with the cylinders of an internal combustion engine, an exhaust manifold, an intake manifold having a portion thereof adapted to be heated by the exhaust manifold, valve means for controlling the flow of the mixture through the inlet against said heating portion and a thermostat controlled in operation by the temperature of the motor for operating said valve means.

4. In combination with the cylinders of an internal combustion engine, an exhaust manifold, an intake manifold having two sections, one of which is adapted to be heated by the exhaust manifold and the other of which is spaced therefrom, a plurality of valves for respectively controlling the passage of the explosive mixture through said intake sections and a thermostat for operating said valves.

In testimony whereof I affix my signature.

HAROLD D. CHURCH.